United States Patent [19]

Mueller et al.

[11] 4,032,143

[45] June 28, 1977

[54] COMPOSITE BASEBALL BAT

[75] Inventors: Alvin W. Mueller, St. Louis, Mo.; Robert J. Williams, Chicago; Robert E. Ansel, Hoffman Estates, both of Ill.

[73] Assignee: DeSoto, Inc., Des Plaines, Ill.

[22] Filed: Sept. 29, 1975

[21] Appl. No.: 617,439

[52] U.S. Cl. .......................... 273/72 R; 273/DIG. 8
[51] Int. Cl.² ...................................... A63B 59/06
[58] Field of Search ............ 273/67 R, 67 A, 72 R, 273/72 A, 73 C, 73 F, 82 R, 82 A, 80 R, 80 C, DIG. 8

[56] References Cited

UNITED STATES PATENTS

| 377,686 | 2/1888 | Moose | 273/72 R |
|---|---|---|---|
| 2,099,521 | 11/1937 | Herkimer et al. | 273/72 R |
| 2,379,006 | 6/1945 | Johnson | 273/72 R |
| 3,048,400 | 8/1962 | Friedman | 273/82 R |
| 3,083,969 | 4/1963 | Bills | 273/80 R |
| 3,301,560 | 1/1967 | Satchell et al. | 273/82 A |
| 3,306,960 | 2/1967 | Weissman et al. | 273/72 R X |
| 3,353,258 | 11/1967 | Barton et al. | 273/82 A X |
| 3,445,113 | 5/1969 | Satchell et al. | 273/82 A |
| 3,467,605 | 9/1969 | Abercrombie et al. | 273/DIG. 8 |
| 3,478,134 | 11/1969 | Gruss et al. | 273/DIG. 8 |
| 3,727,295 | 4/1973 | Gildemeister | 273/72 A X |
| 3,830,496 | 8/1974 | Reizer | 273/72 R |
| 3,854,316 | 12/1974 | Wilson | 273/72 A X |

FOREIGN PATENTS OR APPLICATIONS

| 238,250 | 4/1962 | Australia | 273/73 H |
|---|---|---|---|
| 277,125 | 6/1965 | Australia | 273/82 A |
| 1,046,854 | 10/1966 | United Kingdom | 273/82 A |

Primary Examiner—Richard J. Apley
Attorney, Agent, or Firm—Dressler, Goldsmith, Clement, Gordon & Shore, Ltd.

[57] ABSTRACT

A composite molded baseball bat is provided using a tubular, high yield strength aluminum core surrounded by a foam plastic body having a density of from 30–50 pounds per cubic foot and an integral outer skin. The tubular aluminum core has an outside diameter of from three-quarters to 1 inch and a wall thickness of from 0.062 to 0.125 inch.

12 Claims, 3 Drawing Figures

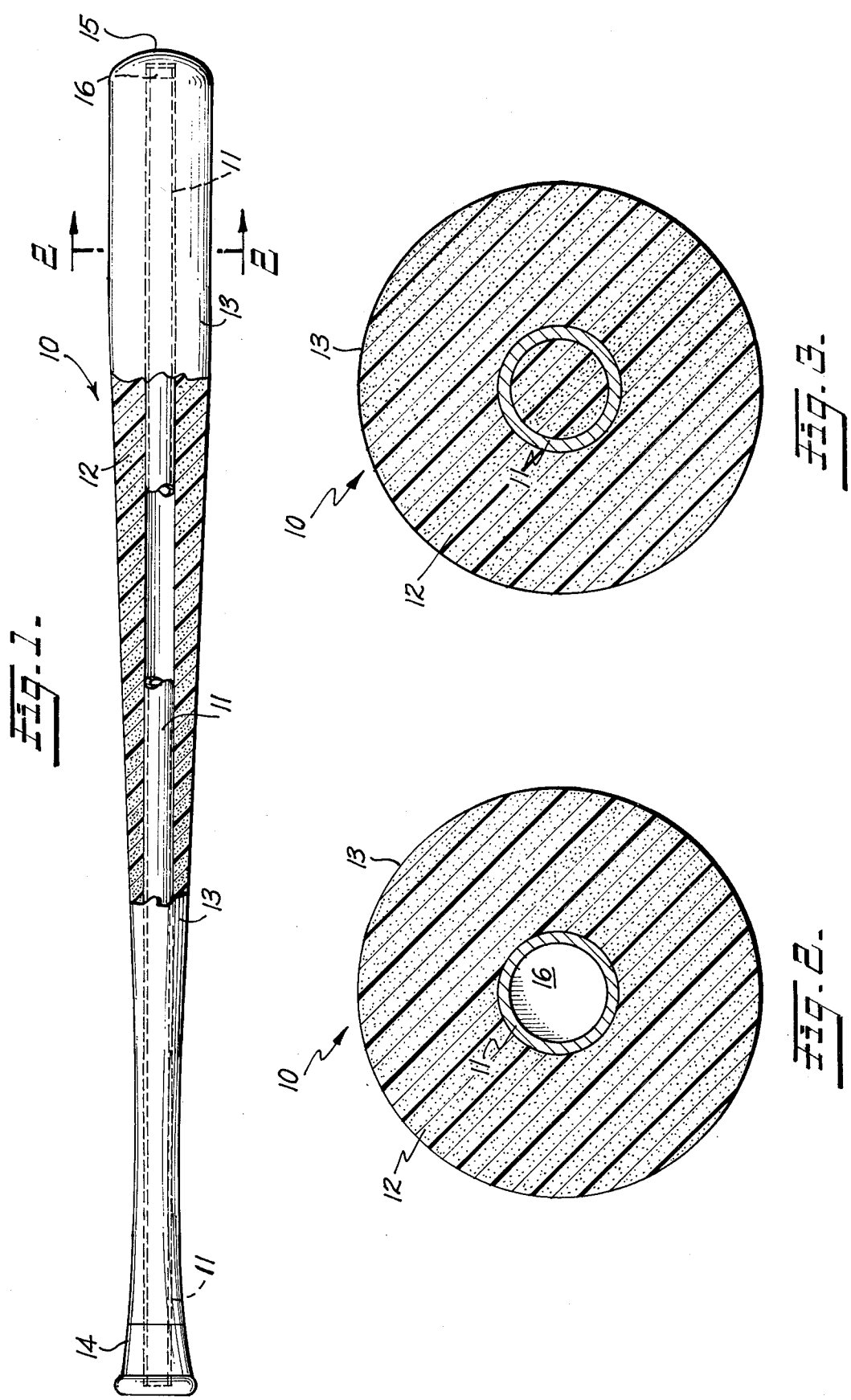

COMPOSITE BASEBALL BAT

The present invention relates to a composite molded baseball bat which resists distortion and provides good ball action when the bat strikes the ball.

Baseball bats are traditionally made of wood, but the art has attempted for many years to replace the wooden bats by a bat made of molded plastic. While numerous efforts have been made, plastic bats having the same striking action of the wooden bats have not been provided, and the bats tended to distort when impacted against the balls.

In accordance with this invention, a baseball bat is formed with a tubular aluminum core having an outside diameter of from three-fourths to 1 inch and a wall thickness of from 0.062 to 0.125 inch and a foam plastic body having a density of from 30–50 pounds per cubic foot is adherently molded around this tubular core. The aluminum is selected to have a yield of at least 30,000 p.s.i., and the molded foam plastic body has an integral skin which sustains itself on ball impact.

The invention will be more fully understood from the accompanying drawing in which:

FIG. 1 is a side view, partially in section, showing a baseball bat constructed in accordance with this invention;

FIG. 2 is a cross section on an enlarged scale, taken on the line 2—2 of FIG. 1; and FIG. 3 is a cross section similar to FIG. 2, but showing a modified bat in which the tubular core is filled with foam plastic.

Referring more particularly to the drawings, the baseball bat 10 is of conventional shape, as pictured, and is constituted by an aluminum tube 11 which runs almost the entire length of the bat, and a molded plastic bat body 12 about the tube. The aluminum tube 11 is hollow and thin walled, as seen in the broken away portion in FIG. 1, and in the enlarged cross section of FIG. 2, and this serves to provide a lighter and less expensive bat particularly suited for younger players. The molded body 12 is of foam plastic, and the outer surface of the body 12 is formed with an integral outer skin 13. The foam plastic body is filled with pigment for desired coloration.

As is evident from FIG. 1, tube 11 extends almost the full length of the bat, with the end of the tube at the large diameter end (striking end) of the bat being covered by a portion 15 of the molded plastic body. A plastic plug 16 closes the end of the tube 11 to keep it from filling with plastic. It is usually sufficient to close only the upper end of the tube, but both ends may be plugged.

The bat can be formed in various manners, but it is preferred to mold it in a generally vertical form which is capped after the aluminum tube is inserted and the foam plastic is poured in to surround the same. This results in a bat lacking a knob at the handle end, and a plastic knob 14 is then glued or molded on to close or cap the tube at the gripping end of the bat.

When plug 16 is omitted, the plastic which foams flows into the tube to fill the same with plastic foam having the same range of density as the foam plastic outside the tube, and this importantly serves to further minimize the sting caused by the high velocity impact of bat on ball produced by the older and stronger players.

Referring more particularly to the aluminum tube, the size, wall thickness, and high yield characteristics are all vital in order that this tube can absorb the impact with the ball. Using other metals, such as steel, the hands feel more stingy when the ball is impacted. When the tube diameter is selected below three-fourths inch, then the tube wall must be made too thick to obtain sufficient yield resistance, and the bat loses its springiness and ball striking action.

Referring more particularly to the thickness of the aluminum tube wall, the broad range of 0.062 to 0.125 inch is useful herein, though the range of 0.07 – 0.10 inch is preferred, and 0.083 inch is used as illustrative. If the tube wall is too thin, the bat will warp, and if it is too thick, then the striking action is impaired.

The foam plastic body must adhere to the aluminum tube in order to transmit the impact forces to the tube. The foam plastic along as a hollow or solid member would not provide a good bat. If the plastic selected does not adhere well to the aluminum tube, then the tube may be primed or abraded for better adhesion, as is conventional in the coating art.

The plastic body must be a foam, since solid plastic does not resemble wood in its ball striking characteristics. Ordinary foams used for insulation have a density in the range of three-fourths to 2 pounds per cubic foot. Foams used in furniture to simulate wood normally have a density in the range of 20–25 pounds per cubic foot. The density needed herein for bat integrity and good ball striking action is in the range of 30–50 pounds per cubic foot.

Of the various plastics which can be foamed and molded under pressure to provide a fine celled foam having the required density, polyurethane foams are preferred. As is well known, the polyurethane is formed by admixture of an organic polyisocyanate and a material providing a plurality of active hydrogen atoms, especially a liquid polyhydric alcohol. In normal practice, pigment such as titanium dioxide in an amount of 2–40% of the weight of the polyhydric alcohol is dispersed in the polyhydric alcohol, a blowing agent, and a catalyst are added, and then the organic polyisocyanate is mixed in to provide a curable mixture containing from 1–30% pigment which is pumped into a mold of bat form (which is preferably vertical), the aluminum tube being positioned within the mold with its upper end closed so that this closed end will be covered by the portion 15. The bat form is clamped until the thermosetting cure is sufficiently completed to permit the form to be opened, and the bat removed. The density is regulated by the proportion of plastic containing the blowing agent which is introduced into the confined mold. The proportion of blowing agent is regulated to provide the desired exterior skin.

While polyurethane foams are preferred, any tough and strong plastic can be used, though it is preferred to employ systems which can be injected into the mold as a flowable liquid at moderate temperature and which cure with time. Epoxy resin systems containing amine curing agents will further illustrate the invention, methylene dianiline illustrating a useful amine. With the aid of heat to liberate amine and speed the cure, dicyandiamide can be used as the amine component.

The invention is further illustrated as follows.

The aluminum tube is selected to be seven-eighths inch in outside diameter, and to have a wall thickness of 0.083 inch. It is constituted by an extruded aluminum tube of high yield strength. A commercial material identified as 7075-T6 supplied, for example, by Reynolds Metal Company may be used.

The bats of this invention have a length in the range of from 30 to 40 inches, but the precise length is secondary so long as the bat is appropriate for the playing of baseball. The aluminum tube extends at least 90% up to 99% of the length of the bat. In preferred practice the tube is 95% to 98% of the length of the bat.

The foam plastic constituting the body of the bat is provided using a self-skinning urethane foam which is molded to have a density of 40 pounds per cubic foot. An illustrative polyurethane composition which can be poured around the aluminum tube within a mold of bat shape and which will harden in about 20 minutes at moderate temperature is as follows.

8417 grams of a liquid sucrose-based polyol provided by adducting sucrose with propylene oxide to form a liquid having a viscosity of 750 centipoises (measured at 25° C), and an hydroxy functionality of 340 milligrams of KOH per gram of polyol, are placed in a 5 gallon container and 2987 grams of titanium dioxide pigment are stirred in together with a yellow iron oxide colorant. This mixture is vigorously stirred on a high speed disperser to provide a good dispersion. The polyhydric alcohol is conveniently constituted by a commercial product supplied by Mobay Chemical Co. under the trade identification E9339, which contains about 15% blowing agent constituted by monofluro trichloromethane. Some of this blowing agent is lost during mixture and is replaced when mixing is concluded. The exact amount of blowing agent will vary with the skin thickness desired. In this example, a foam density of 40 pounds per cubic foot is intended, and monofluro trichloromethane is added in an amount of 5% of the weight of the polyol component originally used, and the amount of foamable mixture introduced into the mold is regulated to provide the desired density. The additional blowing agent is added after cooling and then triethylene diamine catalyst is added to speed the reaction when the organic polyisocyanate is added. Upon the addition of catalyst, we have provided a polyol mixture to which the organic polyisocyanate is added.

The organic polyisocyanate used in this example is 4,4' diphenylmethane diisocyanate in a commercial mixture containing the same together with higher molecular weight isocyanate-functional derivatives thereof having an average NCO content of 31.5 and an average equivalent weight of 131. It is added to the mixture in an amount to provide a weight ratio of polyol mixture to polyisocyanate of 1.45:1. An appropriate commercially available polyisocyanate of this type is E388 obtainable from Mobay Chemical Co.

Upon the addition of the polyisocyanate, the mixture is agitated to provide a uniform mixture, and this mixture is then promptly poured into the bat mold, which is approximately vertical, at a temperature of from 100°–140° F. (120° F. used in this example). The procedure is simply to insert the tube, and then pour in the polyurethane mixture, whereupon the bat mold is clamped and the temperature is controlled within the range specified for 20 minutes to produce a molded bat ready for reception of the handle 14.

The bat described above, depending upon its shape and weight, can be used for either hard ball or soft ball, and possesses characteristics which closely match the conventional wooden bat.

The invention is defined in the claims which follow.

We claim:
1. A baseball bat comprising a tubular, high yield strength aluminum core extending almost the full length of the bat, said core having a diameter of from three-fourths to 1 inch and a wall thickness of from 0.62 to 0.125 inch, said tubular core having adhered to its entire outer surface a foam plastic body having a density of from 30–50 pounds per cubic foot and an integral outer skin, said aluminum having a yield strength of at least 30,000 p.s.i.

2. A baseball bat as recited in claim 1 in which said tubular aluminum core has a wall thickness in the range of 0.07 to 0.10 inch.

3. A baseball bat as recited in claim 2 in which said tubular aluminum core has an outside diameter of approximately seven-eighths inch.

4. A baseball bat as recited in claim 3 in which said tubular aluminum core has a wall thickness of approximately 0.083 inch.

5. A baseball bat as recited in claim 1 in which the plastic of said foam plastic body is pigmented in an amount of from 1–30%.

6. A baseball bat as recited in claim 5 in which the plastic of said foam plastic body is a thermosetting resin in cured condition.

7. A baseball bat as recited in claim 6 in which said plastic body is constituted by a polyurethane foam.

8. A baseball bat as recited in claim 1 in which said foam body has a density of approximately 40 pounds per cubic foot.

9. A baseball bat as recited in claim 1 in which said bat has a length of from about 30 to about 40 inches, and said aluminum tube extends from 90% to 99% of the length of the bat.

10. A baseball bat as recited in claim 9 in which said aluminum tube extends from 95% to 98% of the length of the bat.

11. A baseball bat comprising a tubular, high yield strength aluminum core extending almost the full length of the bat, said core having a diameter of from three-fourths to 1 inch and a wall thickness of from 0.062 to 0.125 inch, said tubular core having adhered to its entire outer surface a foam plastic body having a density of from 30–50 pounds per cubic foot and an integral outer skin, said aluminum having a yield strength of at least 30,000 p.s.i., and said tubular core being hollow and closed with a plug on at least one end thereof.

12. A baseball bat comprising a tubular, high yield strength aluminum core extending almost the full length of the bat, said core having a diameter of from three-fourths to 1 inch and a wall thickness of from 0.062 to 0.125 inch, said tubular core having adhered to its entire outer surface a foam plastic body having a density of from 30–50 pounds per cubic foot and an integral outer skin, said aluminum having a yield strength of at least 30,000 p.s.i., and said tubular core is filled with foam plastic having the same range of density as the foam plastic of said body.

* * * * *

UNITED STATES PATENT OFFICE
CERTIFICATE OF CORRECTION

PATENT NO. : 4,032,143
DATED : June 28, 1977
INVENTOR(S) : Alvin W. Mueller; Robert J. Williams; and Robert E. Ansel It is certified that error appears in the above-identified patent and that said Letters Patent are hereby corrected as shown below:

Col. 2, line 18 "along" should read --alone--

Col. 4, claim 1, line 11, "0.62" should read --.062--

Signed and Sealed this

Thirteenth Day of September 1977

[SEAL]

Attest:

RUTH C. MASON
Attesting Officer

LUTRELLE F. PARKER
Acting Commissioner of Patents and Trademarks

UNITED STATES PATENT OFFICE
CERTIFICATE OF CORRECTION

Patent No. 4,032,143              Dated June 28, 1977

Inventor(s) Alvin W. Mueller; Robert J. Williams; and Robert E. Ansel

It is certified that error appears in the above-identified patent and that said Letters Patent are hereby corrected as shown below:

Col. 2, line 18 "along" should read --alone--

Col. 4, claim 1, line 11, "0.62" should read -- 0.062--.

This certificate to supersede certificate of correction of September 13, 1977.

Signed and Sealed this

Sixth Day of December 1977

[SEAL]

Attest:

RUTH C. MASON
Attesting Officer

LUTRELLE F. PARKER
Acting Commissioner of Patents and Trademarks